Figure 1:
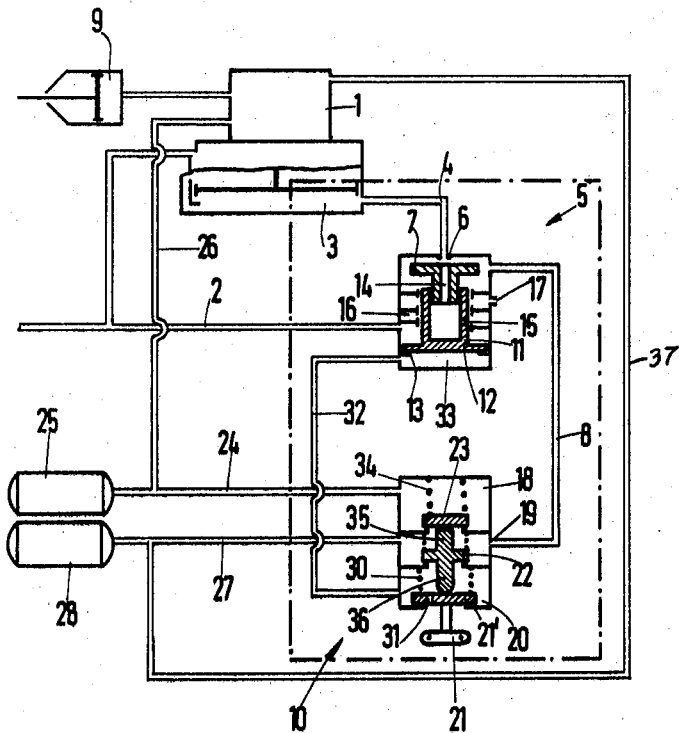

United States Patent [19]
Huber et al.

[11] 3,840,281
[45] Oct. 8, 1974

[54] RELEASE MECHANISM FOR AIR BRAKES OF RAILWAY VEHICLES

[75] Inventors: Johann Huber; Wolfgang Grunert, both of Munich, Germany

[73] Assignee: Knorr-Bremse GmbH, Munich, Germany

[22] Filed: Dec. 26, 1973

[21] Appl. No.: 427,548

[30] Foreign Application Priority Data
Dec. 22, 1972 Germany............................ 2263146

[52] U.S. Cl. ............................................... 303/68
[51] Int. Cl............................................ B60t 15/52
[58] Field of Search .................... 303/18, 68, 69, 81

[56] References Cited
UNITED STATES PATENTS
3,001,833  9/1961  Kirk ...................................... 303/68
3,385,638  5/1968  Mong et al............................ 303/69

Primary Examiner—Duane A. Reger
Attorney, Agent, or Firm—Edmund M. Jaskiewicz

[57] ABSTRACT

A release mechanism for indirectly acting air brakes of a railway vehicle has a valve device which is actuated by the pressure in the main air line and upon actuation lowers the pressure in the control chamber of the brake control valve which connects the brake cylinder to the atmosphere. The valve device is connected to an air tank. A manually operated release valve is provided to actuate the pressure releasing function of the valve device. The valve device has a valve member which is subjected to the pressure of the air tank when in the closed position and opens and closes a connection between the control chamber of the brake control valve and the air tank. The valve member is slidably mounted in the hollow shaft of the piston and brings about the connection of the control chamber to a vent by means of a shut-off member coupled to the shaft. The piston acting in conjunction with the valve member in the opening direction of the shut-off member as well as in the closing direction of the valve member of the control chamber connection is subjected to the pressure of an air tank through the release valve and, in the closing direction of the shut-off member, is subjected to the pressure in the main air line.

9 Claims, 4 Drawing Figures

PATENTED OCT 8 1974 3,840,281

RELEASE MECHANISM FOR AIR BRAKES OF RAILWAY VEHICLES

The present invention relates to a release mechanism for indirectly acting air brakes of a railway vehicle, more particularly, to the structure of the valve device and release valve of the release mechanism.

It has been known to provide a release mechanism of the type described above wherein the control chamber of the brake control valve constructed as a three pressure control valve is provided with a release valve which can be actuated as desired. The release valve has a spring washer which can be lifted by manual tilting against a force exerted by a return spring and a shut-off valve which is opened in this connection by means of a push rod also acting against a spring force. The shut-off valve controls the action of compressed air on a chamber continuously connected to the atmosphere through a throttle valve bore. This action is effected by an accumulated pressure from the control chamber. One wall of the chamber is limited by a differential piston whose other, larger piston surface is loaded by the pressure in the main air line and the piston is coupled to an outlet valve that is opened when subjected to predominant pressure through the chamber. The outlet valve is connected in parallel with the shut-off valve in this connection (German printed specification [DAS] 1 137 468).

While this release mechanism permits a selected partial or full release of the brake when the main air line is charged, a semi-automatic full release when the main air line is without pressure and an automatic full release of the brake by feeding a vacuum into the main air line, it is disadvantageous in that the control chamber together with the control air-tank is always emptied entirely or partially which means an unnecessary loss of compressed air and requires a subsequent lengthy interval to charge the brake. Furthermore, this release mechanism does not have any possibility of emptying the air reservoir as may be required periodically for overhauling. Further, the release mechanism can be used only with three pressure brake control valves and cannot be used with two pressure brake control valves.

There are also other known release mechanisms that do provide the additional possibility of desired emptying of the air reservoir, but they do not permit an automatic actuation through supplying a vacuum into the main air line. Also, the control chamber to be emptied cannot be separated from a control air tank (German printed specification [DAS] 1 142 896).

It is therefore the principal object of the present invention to provide a novel and improved release mechanism for indirectly acting air brakes of a railway vehicle.

It is another object of the present invention to provide a release mechanism of the type as described above which is simple in structure and operates semi-automatically in response to the pressure in the main air line.

It is a further object of the present invention to provide such a release mechanism that can be employed for a single release air brake having a two pressure control valve but can also be used for multiple release air brakes having a three pressure control valve.

The present invention is incorporated in a railway vehicle having an indirectly acting air brake system including a brake control valve connected to a brake cylinder and a control chamber in the control valve. A pressure actuated valve device is connected to a main air line and to the control chamber and an air reservoir is connected to the valve device. According to one aspect of the present invention a release mechanism for such an air brake system comprises a valve member in the valve device with the valve member being subjected to the pressure of the air reservoir in the closed position. The valve member monitors the connection between the control chamber of the brake control valve and the air reservoir. The valve member is slidably mounted on a tubular shaft having a piston on one end thereof and connects the control chamber to a vent to the atmosphere by valve means coupled to the shaft. This connection to the vent is accomplished by the piston acting by means of the valve member which, in the opening direction of the valve means as well as in the closing direction of the connection between the control chamber and the reservoir, is subjected to the pressure of at least one compressed air tank through the release valve and, inversely, the valve member is subjected to the pressure in the main air line when acting in the closing direction of the valve means.

Figure 2:
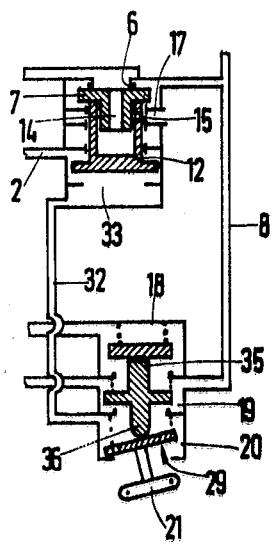
Figure 3:
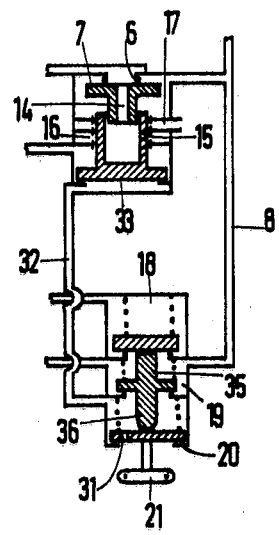
Figure 4:
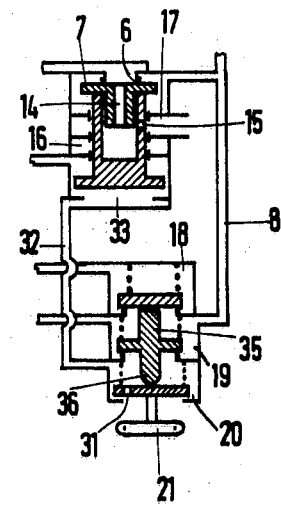

Other objects and advantages of the present invention will be apparent upon reference to the accompanying description when taken into conjunction with the following drawings, which are exemplary, wherein;

FIG. 1 is a schematic representation of the release mechanism of the present invention when utilized with a single release air brake; and FIGS. 2–4 are partial views of FIG. 1 and showing the different switching positions of the valve device and the release valve of the release mechanism.

Proceeding next to the drawings wherein like reference symbols indicate the same parts throughout the various views a specific embodiment of the present invention will be described in detail.

In FIG. 1 it can be seen that the conventional brake control valve, in this instance a two pressure control valve 1, is connected to a main air line 2. A control chamber 3 of brake control valve 1 is connected through a pressure line 4 to a valve device 5, wherein it terminates at a valve seat 6 on the housing of the valve device and, when a valve member 7 is lifted from valve seat 6, the control chamber is connected through a pressure line 8 to a release valve 10. A wheel brake cylinder 9 is connected in the conventional manner to the two pressure control valve 1 fed from an air reservoir 28 through a line 37.

Valve member 7 is movably supported in a tubular shaft 11 of a piston 12 disposed in desplaceable manner in valve device 5 and loaded by the pressure in main air line 2 on its face directed toward shaft 11. When the valve member 7 is acted upon by the pressure in main air line 2, piston 12 assumes a lower position in which it contacts a stop 13.

Valve member disk 7 is traversed by a central bore 14, which is smaller than valve seat 6 and ends in a cavity situated in shaft 11 and employed for guiding valve member 7. The wall of shaft 11 is traversed by a radial bore 15 which ends in the cavity. Shaft 11 is tightly and sealingly displaceable within a closed chamber 16 and a second chamber is connected to chamber 16 in the direction toward valve member 7 and is provided with a vent 17 to the atmosphere. When piston 12 is in contact with stop 13, bore 15 ends in closed chamber 16. In the opposite end position of piston 12, wherein the piston presses valve member 7 through shaft 11 against valve seat 6, bore 15 ends in the chamber provided with vent 17. On the side away from shaft 11, piston 12 is loaded by the pressure of a chamber 33.

Thus, the valve member 7 closes off the shaft 11 at its end opposite the piston 12 and is provided with a central bore 14 and a bore 15 is provided in the piston shaft 11 as a valve shutoff member for the connection between the control chamber 3 and the vent 17. The bore 15 is permanently connected to the central bore 14, on the one hand, and, on the other hand, it is shut off in the position of the shaft which corresponds to the loading of the piston 12, by the overpressure from the main air line 2, and it ends in the atmosphere in the opposite position of the shaft. This structure thus advantageously combines the piston, the valve member and the shut-off element in a simple yet effective manner.

Release valve 10 consists essentially of three pressure chambers 18, 19 and 20 that are closed in relation to one another by a spring-loaded closing plate 22, which can be lifted manually by means of a spring-loaded release traction device 21, and a spring-loaded sealing plate 23. An emergency brake tank 25 is connected to pressure chamber 18 through a pressure line 24 which has a branch 26 leading to the emergency brake portion of the control valve 1. Pressure chamber 19, which is connected to valve device 5 through pressure line 8, is connected to air reservoir 28 by means of pressure line 27.

As it can be seen clearly in the drawings, pressure chamber 20 contains a tilting disk 21' pressed by a spring 30 against the edge of an opening 29. The tilting disk 21' is connected rigidly to release traction device 21. A nozzle 31 passes through tilting disk 21'. In the normal or rest position, wherein the return spring 30 presses tilting disk 21' against the bottom of pressure chamber 20, pressure chamber 20 communicates with the atmosphere in throttled connection through the small cross section of nozzle 31. When release traction device 21 is operated manually, disk 21' is tilted, as shown in FIG. 2, to release an opening 29 which is larger in cross section with respect to nozzle 31. Pressure chamber 20 is connected through a pressure line 32 to pressure chamber 33 of valve device 5. Sealing plate 23 loaded by restoring spring 34 and monitoring the connection of first pressure chamber 18 and second pressure chamber 19, is so arranged that it can be actuated by the pressure prevailing in pressure chamber 19 against the force of restoring spring 34. Closing plate 22 is provided with two axially extending projections 35 and 36 on its two pressure surfaces. These projections provide a mechanical coupling between tilting disk 21' and sealing plate 23.

It is advantageous in release mechanisms for single-release compressed air brakes having an emergency brake tank in addition to the air reservoir to provide the release valve with second and third pressure chambers that are separated from each other when the release valve is not actuated and communicate with one another through the spring-loaded closing plate, which is lifted arbitrarily by means of a spring-loaded traction-release device 21, and a spring-loaded sealing plate 29, when the release valve is actuated. The first pressure chamber is connected to the emergency brake tank and the second pressure chamber is connected to the air reservoir. The connection between the control chamber and the air reservoir, monitored by the valve member 7, is effected through the pressure line 8 leading from a chamber containing the valve disk to the second pressure chamber 19 and that a piston pressure chamber 33 of the valve device acting on the piston in the closing direction of the shut-off member is connected to the third pressure chamber 20 through a pressure line 32. This has the advantage that the two pressure tanks 25 and 28 are separate from one another, but the emergency brake tank can be charged from the air reservoir through the spring-loaded sealing plate and, furthermore, the tanks can be emptied simultaneously through a continued actuation of the traction release device 21.

In order to initiate this control operation in the valve device 5, the third control chamber 20 is provided with a connection of small cross section to the atmosphere in the rest position of the release traction device 21, and to provide a connection to the atmosphere of relatively large cross section in the control chamber 20 when the release traction device 21 is in the actuated position as in FIG. 2. The connection between the first and the second pressure chambers is controlled by the spring-loaded sealing plate 23, which is so arranged that it can be actuated by the pressure prevailing in the second control chamber 19 against the force of restoring spring 34 and the air pressure of the emergency brake tank 25.

The second control chamber 19 is closed off in relation to the third control chamber 20 by means of a closing plate 22 acted upon by a restoring spring and the chamber pressure effective in the closing direction. The closing plate has mechanical connections between the sealing plate 23 closing off the first pressure chamber and the release traction device 21. The several components of the invention acted upon by pressure and springs are so adjusted in relation to one another that, at a particular pressure increase in the control chamber 1, the valve member 7 and the sealing plate 23 are operated into opening position at an approximate equalization of pressure between the control pressure, the pressure in the main air line 2 and the pressure in the emergency brake tank 25.

The operation of the release mechanism of the invention will next be described. When the brake is charged and released, the above described components will be in the positions illustrated in FIG. 1. While the piston 12 is in its lowered position and valve member 7 is down away from valve seat 6, control chamber 3 is filled from air reservoir 28 through line 8, pressure chamber 20 and pressure chamber 33 are without pressure and, through the lifting of sealing plate 23 against its spring-load, the compressed air from air reservoir 28 can flow into emergency air tank 25. When the double pressure control valve 1 is in the braking position while the brake system is filled with compressed air and main air line 2 is emptied, brake cylinder 9 can be vented automatically through a brief actuation of release valve 10 by means of traction release device 21. The pressures in reservoir 28 and emergency brake tank 25 remain unchanged. This procedure is shown in FIG. 2.

Through a brief pulling of traction release device 21, closing plate 22 is lifted through tilting of tilting disk 21', so that projection 35 lifts simultaneously sealing plate 23 from its valve seat. The air in air reservoir 28 and in emergency brake tank 25 can thus flow through pressure chambers 18 and 19 into pressure chamber 20 and build up an accumulation of pressure therein, which accumulation of pressure is effective through pressure line 32 into pressure chamber 33 situated under piston 12. The piston 12 is lifted while main air line 2 is without pressure and presses valve member 7 against its valve seat 6 attached to the housing to separate or disconnect pressure line 8 from control chamber 3. Control chamber 3 of double pressure control valve 1 is now connected to the atmosphere through bores 14 and 15, so that control chamber 3 is emptied through vent 17 and double pressure control valve 1 reaches it release position. Piston 12 remains in this position because of the friction forces acting on its peripheral surface while the pressure in pressure chamber 33 and pressure line 32 is gradually reduced through nozzle 31.

When main air line 2 is again filled with compressed air, piston 12 will return to its starting position at which time the connection between control chamber 3 and vent 17 is interrupted. On the other hand, valve member 7 remains in the position wherein it interrupts the connection between control chamber 3 and pressure line 8, since the pressure of the air in the reservoir prevailing in pressure line 8, acts on valve member 7 in the closing direction. This position is illustrated in FIG. 3. Valve member 7 opens the connection between control chamber 3 and release valve 10 and, accordingly, the air reservoir 28 only when control chamber 3 of the double pressure control valve 1 is filled with compressed air (through a supply nozzle that is not shown in the drawings) so that the pressure attains the level of pressure retained in the air reservoir.

The dimensions of the control surfaces and the cross sections are so selected that during filling of main air line 2 the return of piston 12 into the lower position will occur at a main air pressure 0.3 kp/cm². Further, upon a pressure increase in control chamber 3, as mentioned above, at an approximate equalization of the pressures in control chamber 3, pressure line 8 and, accordingly, air reservoir 28 and, possibly, also emergency-brake air tank 25, the pressure in control chamber 3 will lift valve member 7 from valve seat 6. Thus, the connection between control chamber 3 and the air tanks is established through pressure line 8.

As illustrated in FIG. 4, valve device 5 can be actuated for the purpose of automatic release also by evacuating main air line 2. If main air line 2 is evacuated, piston 12 is lifted to exert pressure on valve seat 6 and control chamber 3 is connected to vent through bores 14, 15, while air reservoir 28 is shut off. As described above, piston 12 remains in this position because of friction forces. During a subsequent operation of the brake, the above-described sequences occur because of the pressure increase in the main air line 2.

Should air reservoir 28 and emergency brake air tank 25 be emptied, a continued manual actuation of release valve 10 will cause a flow of compressed air through chambers 18, 19 and 20 and through opening 29 to the atmosphere.

When the release mechanism as indicated by a dot-dash line in FIG. 1 is employed in a multiple-release compressed air brake comprising a triple pressure control valve, pressure line 4 is to be connected to the constant-pressure control chamber of the control valve, pressure line 27 is connected to the corresponding control air tank and pressure line 24 is connected to the brake air reservoir. The force of restoring spring 34 must be increased so that the pressure in pressure chamber 19 cannot lift sealing plate 23. The operation corresponds to the above description, with the exception of the overflow of the compressed air from pressure chamber 19 into pressure chamber 18, which is not possible.

It will be understood that this invention is susceptible to modification in order to adapt it to different usages and conditions, and accordingly, it is desired to comprehend such modifications within this invention as may fall within the scope of the appended claims.

What is claimed is:

1. In a railway vehicle having an indirectly acting air brake system including a brake control valve connected to a brake cylinder and a control chamber in the control valve, a pressure actuated valve device connected to a main air line and to said control chamber and an air reservoir connected to said brake device, a release mechanism comprising of a tubular shaft movably mounted within said valve device and a piston on said shaft, a valve member within said valve device and slidably mounted on said shaft to move between positions to close and open said control chamber connection, said valve member being subjected to the pressure in the air reservoir when in a closed position, a manually actuated release valve interconnected between said valve device and air reservoir and having means therein defining a passage between said air reservoir and said valve device, said valve device having therein a vent to the atmosphere, valve means coupled to said shaft for connecting and disconnecting said control chamber to said valve device vent, and means responsive to said release valve for subjecting said piston to the pressure in the air reservoir through said release valve when said valve means is moving to connect said control chamber to said vent, said piston being subjected to the main air line pressure when said valve means is moving to disconnect said control chamber from said valve device vent.

2. In a railway vehicle as claimed in claim 1 wherein said piston is on one end of said tubular shaft and said valve member is mounted to close off the other end of said shaft, said valve member having a central bore therethrough.

3. In a railway vehicle as claimed in claim 2 wherein said valve means comprises an opening in said tubular shaft communicating with said valve member bore, said opening being closed from said vent when said shaft and piston is in the position in which it is subjected to said main air line pressure and open to said vent when said shaft and piston is in the other position thereof.

4. In a railway vehicle as claimed in claim 1 and stop means within said valve device for limiting the stroke of said piston in the direction opposite to the closing direction of said valve member.

5. In a railway vehicle as claimed in claim 1 and also having an emergency brake tank and wherein said release valve comprises first, second, and third pressure chambers which are separated from each other when the release valve is in its nonactuated position, said release valve further comprising a spring loaded release device operatively connected to a spring loaded closing plate and to a spring loaded sealing plate, said first chamber being connected to said emergency brake tank and said second chamber being connected to the air reservoir, said release valve passage defining means comprising an air line between said valve device and said second chamber to connect said brake valve control chamber to the air reservoir when said valve member opens said control chamber connection, there being a piston pressure chamber within said valve device connected to said third pressure chamber.

6. In a railway vehicle as claimed in claim 5 wherein said third pressure chamber has an opening to the atmosphere of relatively small cross-sections said release valve release device being resiliently urged to the closed position when nonactuated, said third pressure chamber having a relatively large cross-section opening to the atmosphere in the actuated position of the release device.

7. In a railway vehicle as claimed in claim 5 wherein said sealing plate controls the connection between said first and second pressure chambers and is urged into the closed position by a return spring and the pressure in said emergency brake tank, said sealing plate being opened by pressure in said second pressure chamber.

8. In a railway vehicle as claimed in claim 5 wherein said closing plate is urged into a closed position between said second and third pressure chambers by a spring and the pressure in said second chamber, and means extending from each of the surfaces of said closing plate and operatively coupling said closing plate with said sealing plate and said release device.

9. In a railway vehicle as claimed in claim 5 wherein said valve member and said sealing plate are opened upon a predetermined increase in pressure in said brake valve control chamber, said increased pressure being substantially equal to the pressures in the main air line and in said emergency brake tank.

* * * * *